US010863532B2

(12) United States Patent
Yi et al.

(10) Patent No.: US 10,863,532 B2
(45) Date of Patent: Dec. 8, 2020

(54) METHOD FOR TRANSMITTING DATA IN A COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/085,955

(22) PCT Filed: Mar. 23, 2017

(86) PCT No.: PCT/KR2017/003126

§ 371 (c)(1),
(2) Date: Sep. 17, 2018

(87) PCT Pub. No.: WO2017/164665

PCT Pub. Date: Sep. 28, 2017

(65) Prior Publication Data

US 2019/0037442 A1 Jan. 31, 2019

Related U.S. Application Data

(60) Provisional application No. 62/312,477, filed on Mar. 24, 2016.

(51) Int. Cl.

*H04W 72/12* (2009.01)
*H04W 76/27* (2018.01)

(Continued)

(52) U.S. Cl.

CPC ....... *H04W 72/1242* (2013.01); *H04L 1/1812* (2013.01); *H04L 5/0048* (2013.01);

(Continued)

(58) Field of Classification Search

CPC .......................... H04W 72/10; H04W 28/0278

See application file for complete search history.

(56) References Cited

U.S. PATENT DOCUMENTS

2009/0316637 A1 12/2009 Yi et al.
2011/0092201 A1 4/2011 Lindstrom et al.

(Continued)

FOREIGN PATENT DOCUMENTS

| | | |
|---|---|---|
| EP | 3340572 | 6/2018 |
| WO | 2014163288 | 10/2014 |
| WO | 2015099321 | 7/2015 |

OTHER PUBLICATIONS

PCT International Application No. PCT/KR2017/003126, Written Opinion of the International Searching Authority dated Jul. 26, 2017, 12 pages.

(Continued)

*Primary Examiner* — Melanie Jagannathan

(74) *Attorney, Agent, or Firm* — Lee Hong Degerman Kang Waimey

(57) ABSTRACT

The present invention relates to a wireless communication system. More specifically, the present invention relates to a method and a device for transmitting data in a wireless communication system. According to an aspect of the present invention, the method comprising: receiving, from an enhanced Node B (eNB), a grant with an indication that indicates at least one radio bearer (RB) of which data should be transmitted using the received grant, wherein each of RBs configured to the UE is associated with a respective logical channel priority; generating a medium access control protocol data unit (MAC PDU) including data of the indicated at least one RB; and transmitting the MAC PDU using the grant.

10 Claims, 9 Drawing Sheets

E-UMTS

Core Network (CN)

Access Gateway (AG)

eNode B eNode B

UE

(51) Int. Cl.

| | |
|---|---|
| ***H04L 1/18*** | (2006.01) |
| ***H04L 5/00*** | (2006.01) |
| ***H04W 28/06*** | (2009.01) |
| ***H04W 72/04*** | (2009.01) |
| ***H04W 72/14*** | (2009.01) |
| ***H04W 80/02*** | (2009.01) |
| ***H04W 80/08*** | (2009.01) |

(52) U.S. Cl.

CPC ..... *H04W 28/065* (2013.01); *H04W 72/0406* (2013.01); *H04W 72/0446* (2013.01); *H04W 76/27* (2018.02); *H04L 5/0044* (2013.01); *H04W 72/1289* (2013.01); *H04W 72/14* (2013.01); *H04W 80/02* (2013.01); *H04W 80/08* (2013.01)

(56) References Cited

U.S. PATENT DOCUMENTS

2011/0170495 A1 7/2011 Earnshaw et al.
2011/0267959 A1* 11/2011 Yi ........................ H04W 72/10 370/241
2011/0310937 A1 12/2011 Lin et al.
2012/0069805 A1* 3/2012 Feuersanger ..... H04W 72/1284 370/329
2014/0204852 A1 7/2014 Iwamura et al.
2014/0286266 A1 9/2014 Sammour et al.
2015/0043547 A1 2/2015 Pelletier et al.
2016/0100397 A1 4/2016 Wen et al.
2016/0143025 A1 5/2016 Chen et al.
2017/0257876 A1* 9/2017 Loehr .................. H04L 5/0044
2018/0071237 A1 3/2018 Saito

OTHER PUBLICATIONS

PCT International Application No. PCT/KR2017/003132, Written Opinion of the International Searching Authority dated Jun. 28, 2017, 8 pages.

Samsung, "UL LAA support and UL Scheduling in MAC", 3GPP TSG RAN WG2 Meeting #90, R2-152243, May 2015, 3 pages.

3rd Generation Partnership Project (3GPP), "Technical Specification Group Radio Access Network; Evolved Universal Terrestrial Radio Access (E-UTRA); Medium Access Control (MAC) protocol specification (Release 13)," 3GPP TS 36.321 V13.0.0, Dec. 2015, 83 pages.

European Patent Office Application Serial No. 17770638.9, Search Report dated Aug. 14, 2019, 9 pages.

Qualcomm, et al., "ProSe Priority", SA WG2 Meeting #109, S2-151779, XP050979169, May 2015, 6 pages.

United States Patent and Trademark Office U.S. Appl. No. 16/088,053, Office Action dated Jan. 3, 2020, 9 pages.

* cited by examiner

[Fig. 1]
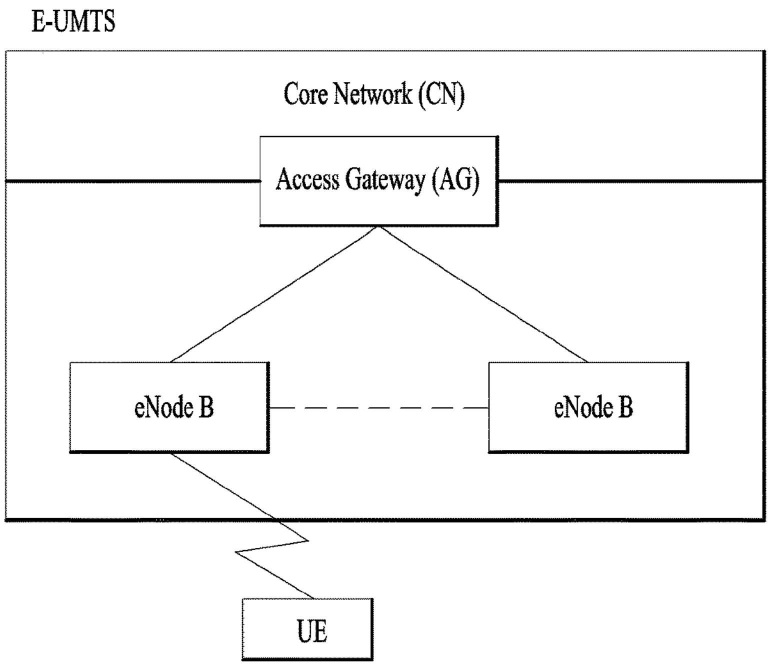
[Fig. 2a]
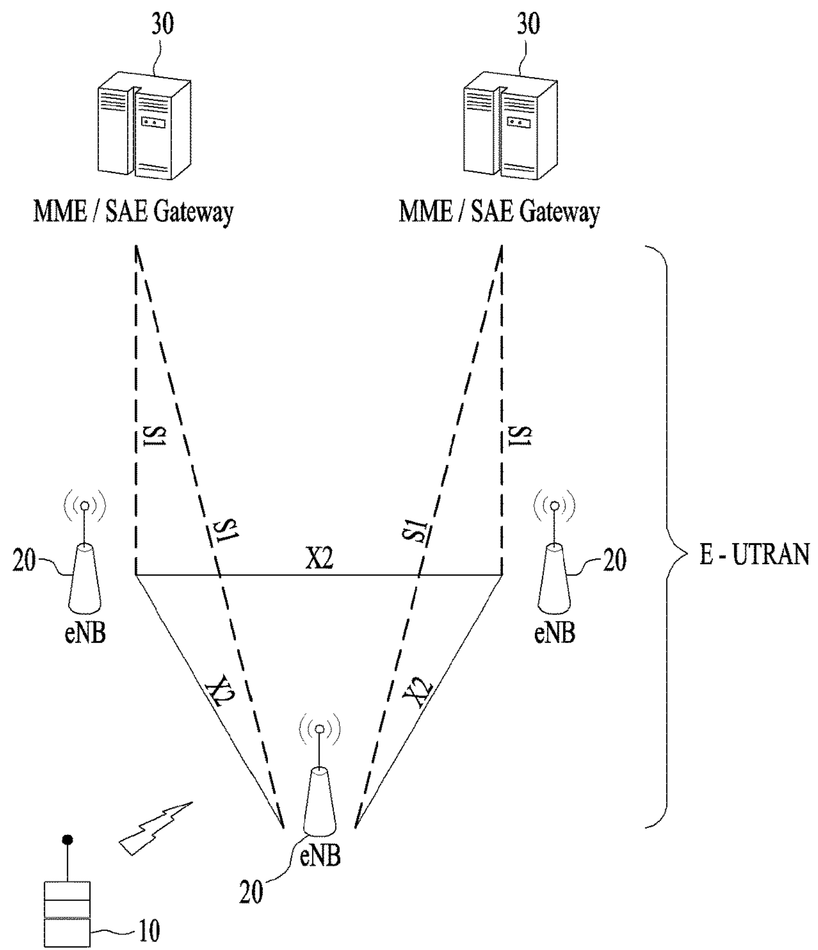

[Fig. 2b]
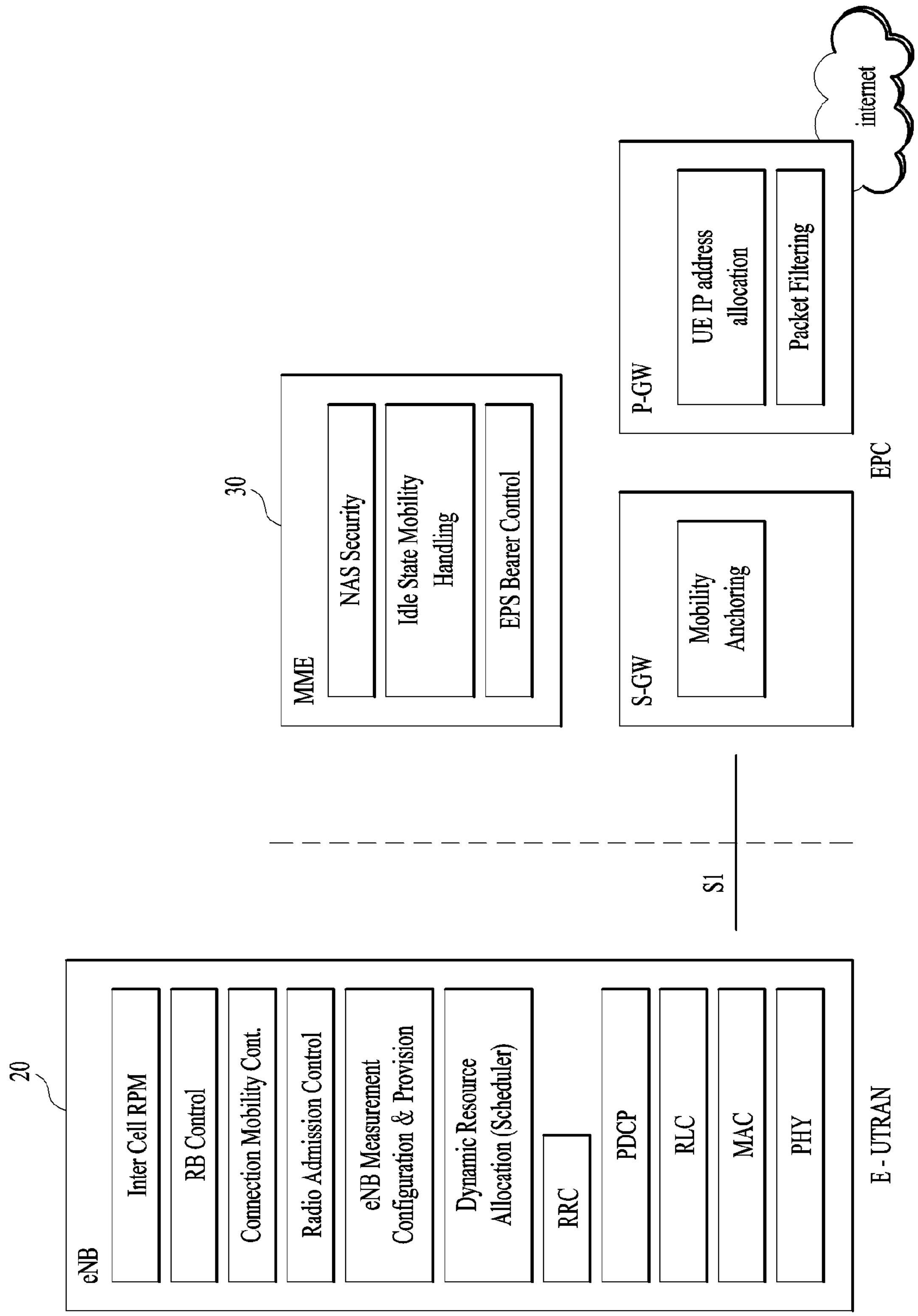

[Fig. 3]
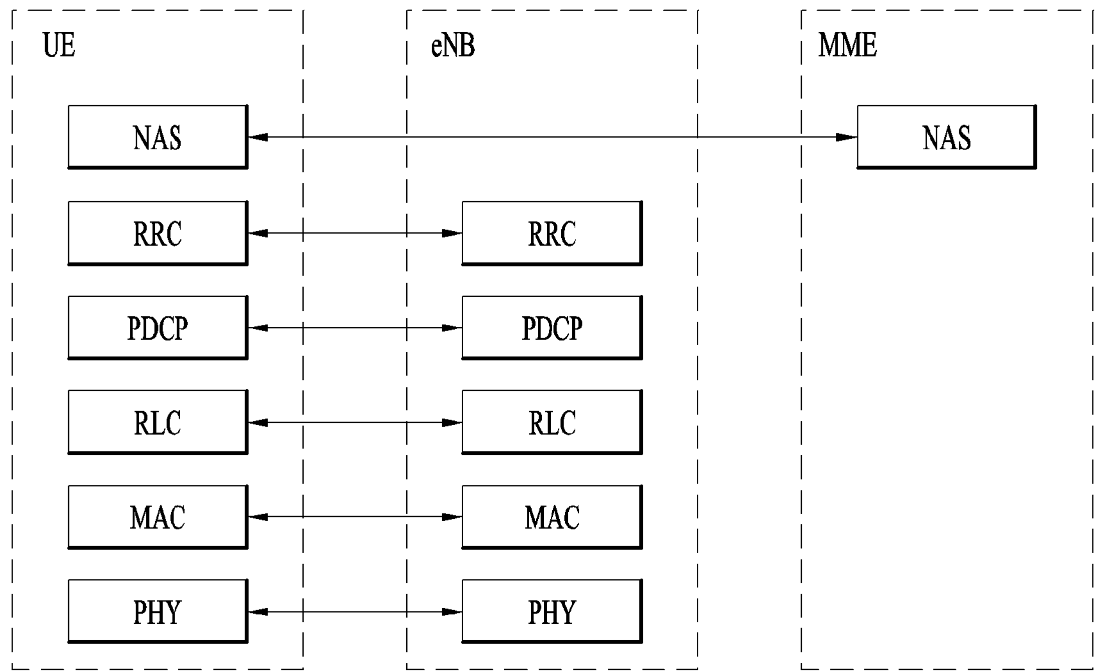
( a ) Control-Plane Protocol Stack
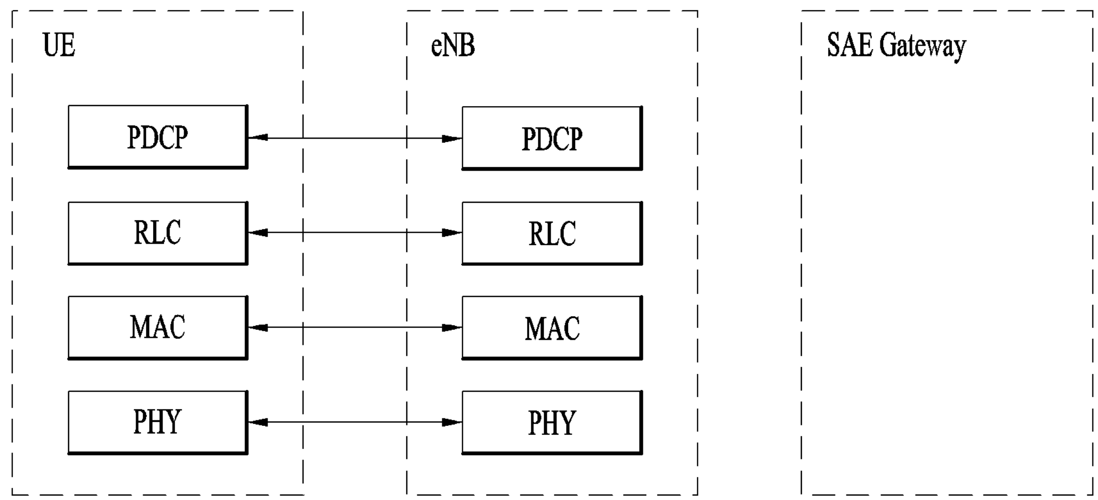
( b ) User-Plane Protocol Stack

[Fig. 4]
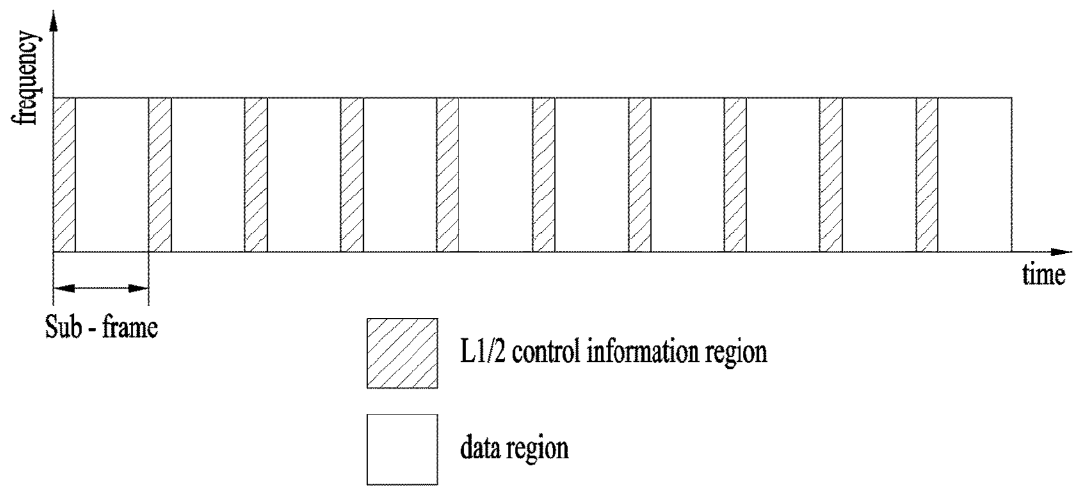
[Fig. 5]
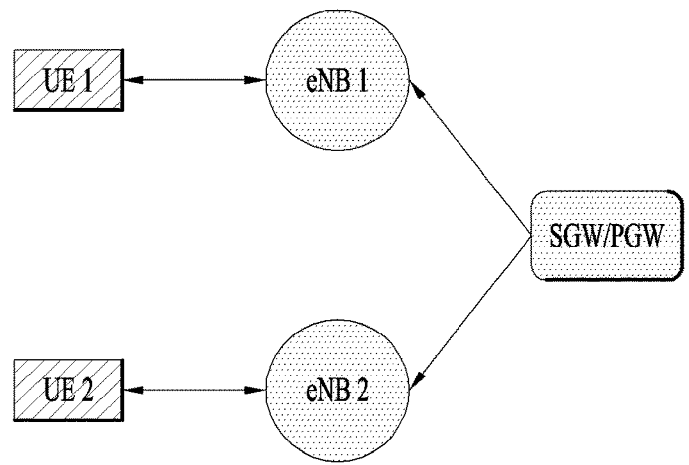
[Fig. 6]
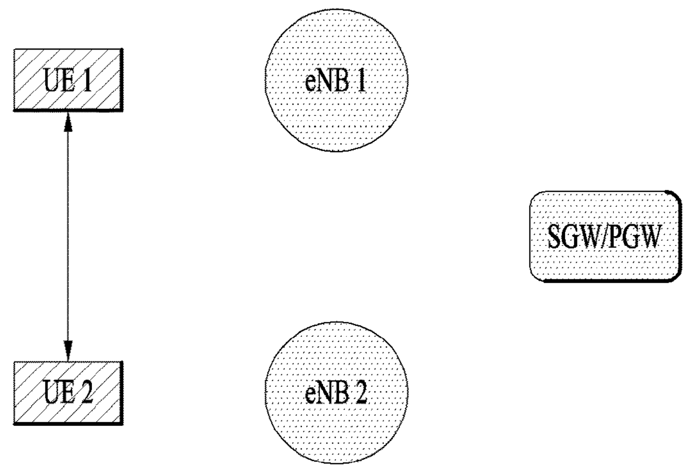

[Fig. 7]
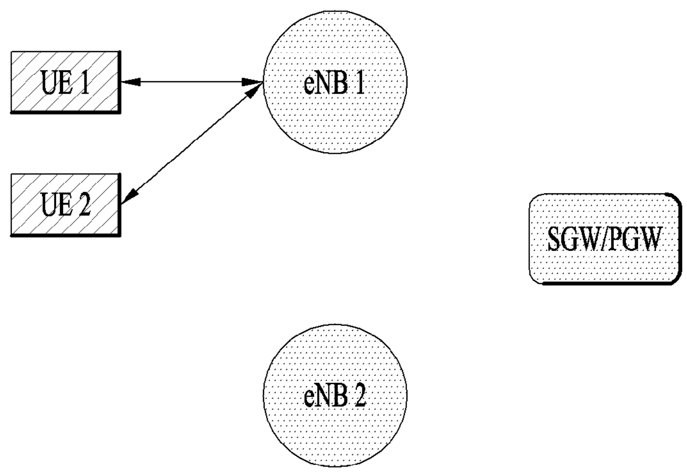
[Fig. 8]
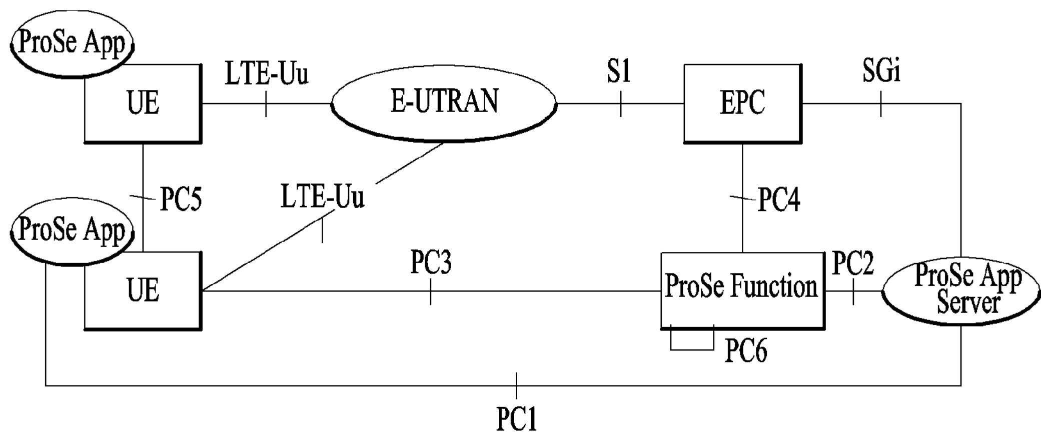

[Fig. 9]
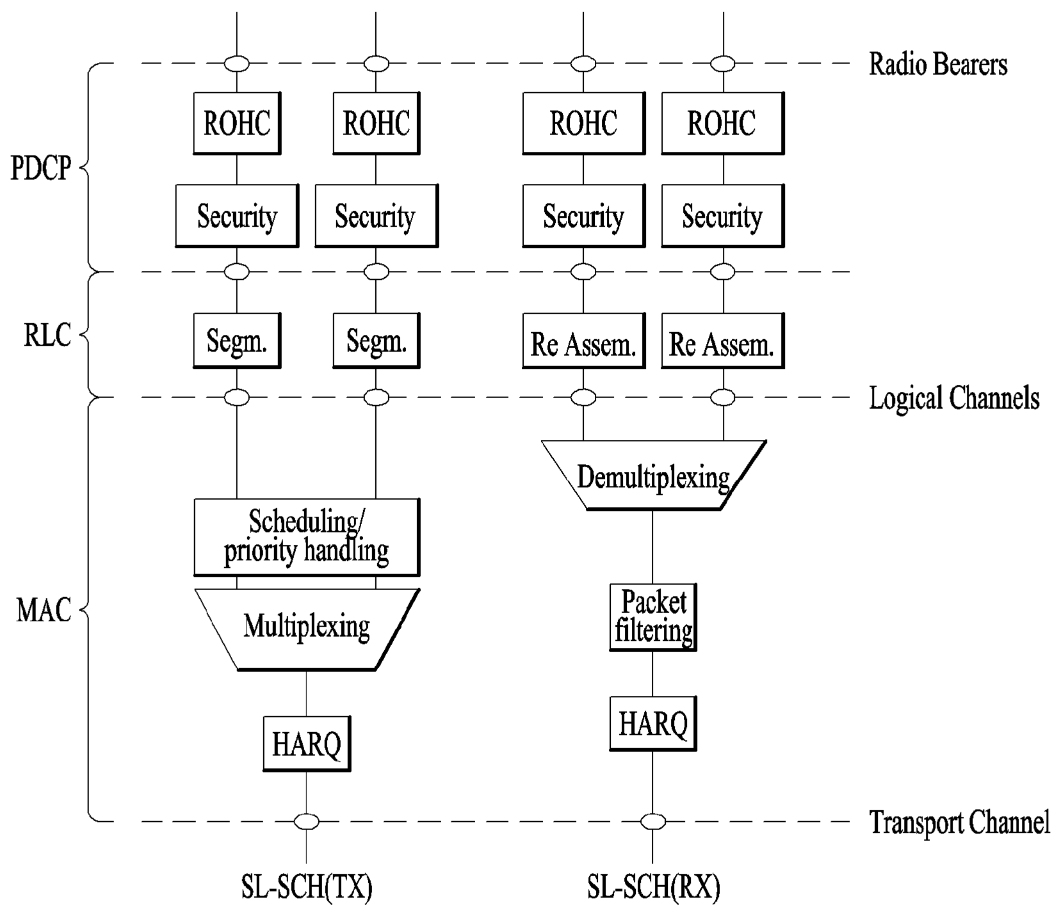

[Fig. 10]
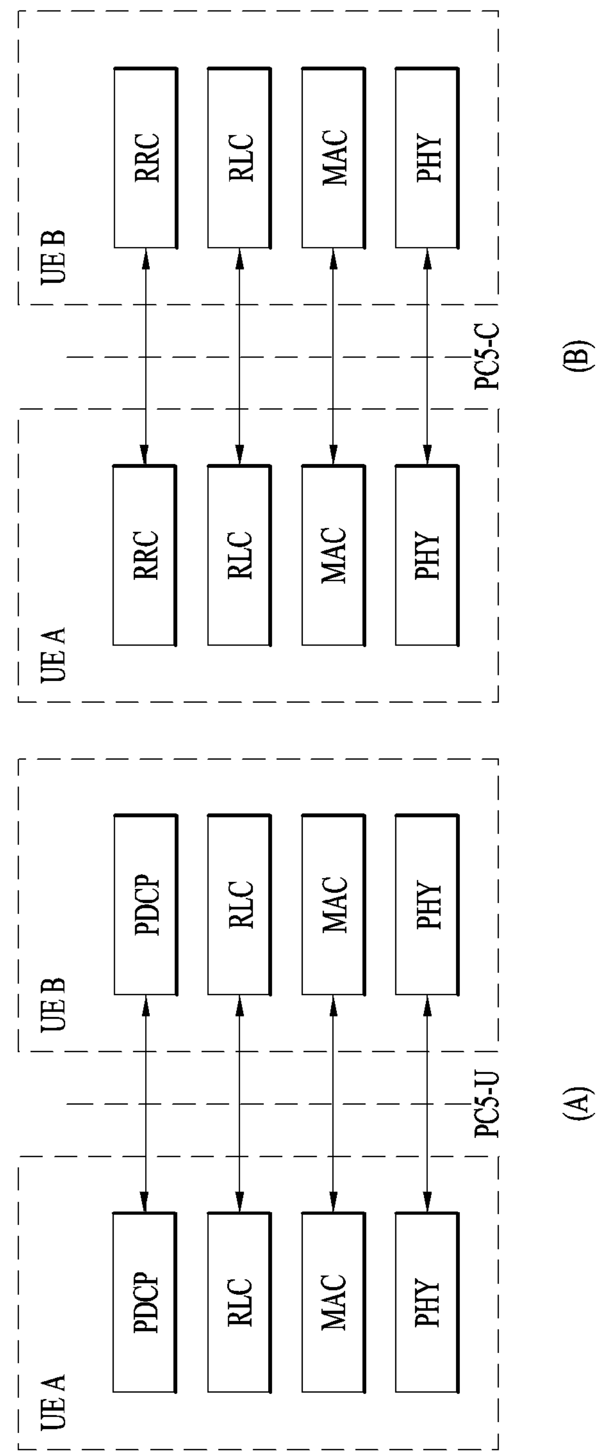

[Fig. 11]
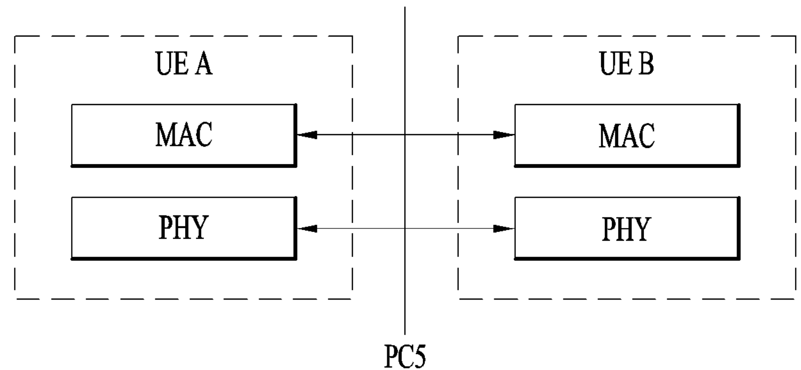
[Fig. 12]
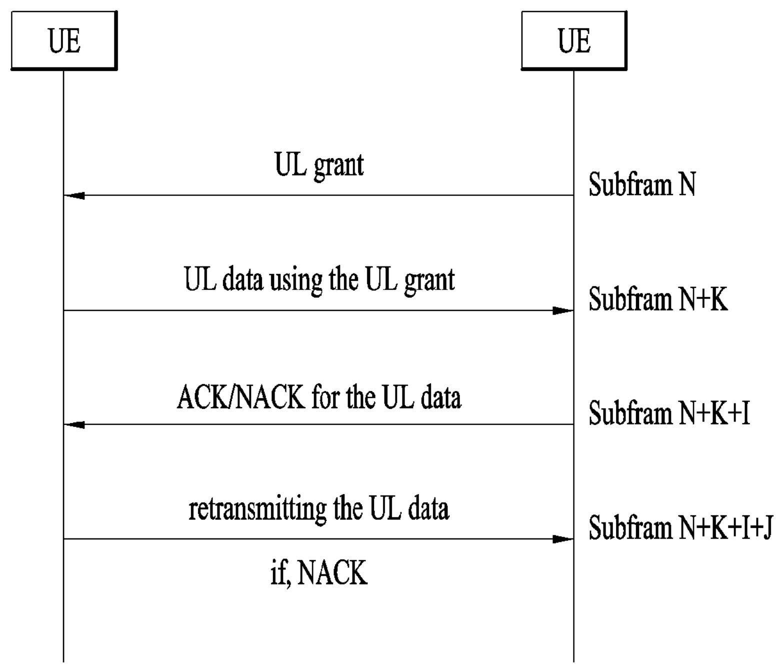

[Fig. 13]
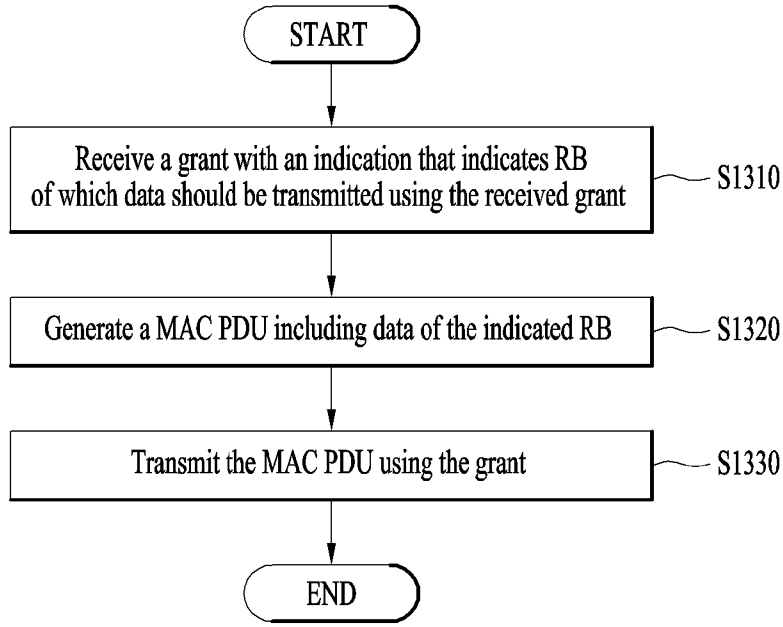
[Fig. 14]
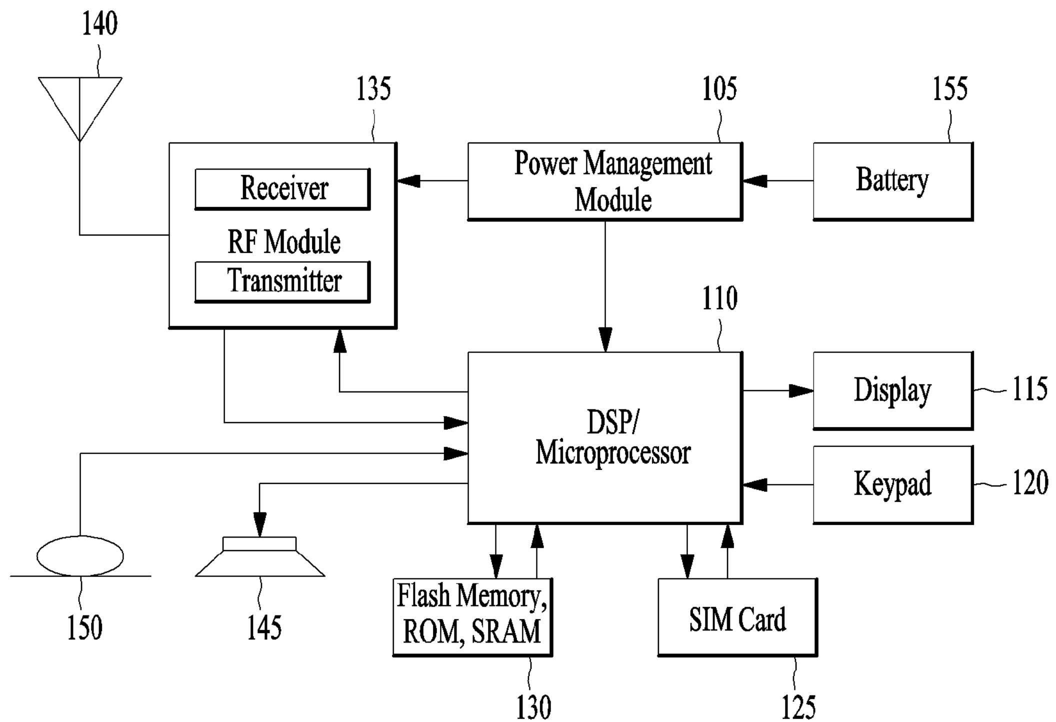

METHOD FOR TRANSMITTING DATA IN A COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/003126, filed on Mar. 23, 2017, which claims the benefit of U.S. Provisional Application No. 62/312,477, filed on Mar. 24, 2016, the contents of which are all hereby incorporated by reference herein in their entirety.

TECHNICAL FIELD

The present invention relates to a wireless communication system and, more particularly, to a method for transmitting data in a wireless communication system.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Based on the above-mentioned discussion, methods for transmitting data in a wireless communication system and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method for a user equipment (UE) operating in a wireless communication system, the method comprising: receiving, from an enhanced Node B (eNB), a grant with an indication that indicates at least one radio bearer (RB) of which data should be transmitted using the received grant, wherein each of RBs configured to the UE is associated with a respective logical channel priority; generating a medium access control protocol data unit (MAC PDU) including data of the indicated at least one RB; and transmitting the MAC PDU using the grant.

In accordance with another aspect of the present invention, A User Equipment (UE) for operating in a wireless communication system, the UE comprising: a Radio Frequency (RF) module; and a processor operably coupled with the RF module, wherein the processor is configured to: control the RF module to receive, from an enhanced Node B (eNB), a grant with an indication that indicates at least one radio bearer (RB) of which data should be transmitted using the received grant, wherein each of RBs configured to the UE is associated with a respective logical channel priority, generate a medium access control protocol data unit (MAC PDU) including data of the indicated at least one RB, and control the RF module to transmit the MAC PDU using the grant.

Preferably, when the indication indicates two or more RBs, a logical channel prioritization (LCP) procedure for the generating the MAC PDU is performed in decreasing order of logical channel priorities of the two or more RBs.

Preferably, if there is remaining space in the grant after performing a logical channel prioritization (LCP) procedure for the indicated RBs, the UE fills the remaining space either with padding or with data from other RBs by performing another LCP procedure for other RBs.

The method further comprising changing logical channel priorities of the RBs indicated by the indication to be higher than logical channel priorities of the RBs not indicated by the indication when performing a logical channel prioritization (LCP) procedure.

The method further comprising changing prioritized bit rate (PBR) of the indicated RBs to infinity.

Preferably, the grant is UL grant used for the UE to transmit data to the eNB via Uu interface or SL grant used for the UE to transmit data to an associated UE via PC5 interface.

Preferably, the indication is included in the grant, or transmitted together with grant as separate control information.

It is to be understood that both the foregoing general description and the following detailed description of the present invention are exemplary and explanatory and are intended to provide further explanation of the invention as claimed.

Advantageous Effects

According to the present invention, the UE can transmit data of a specific RB in a wireless communication system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is an example of default data path for a normal communication;

FIGS. 6 and 7 are examples of data path scenarios for a proximity communication;

FIG. 8 is a conceptual diagram illustrating for a non-roaming reference architecture;

FIG. 9 is a conceptual diagram illustrating for a Layer 2 Structure for Sidelink;

FIG. 10*a* is a conceptual diagram illustrating for User-Plane protocol stack for ProSe Direct Communication, and FIG. 10*b* is Control-Plane protocol stack for ProSe Direct Communication;

FIG. 11 is a conceptual diagram illustrating for a PC5 interface for ProSe Direct Discovery;

FIG. 12 is a conceptual diagram for uplink grant reception;

FIG. 13 is a flowchart illustrating a method for transmitting data in accordance with one embodiment of the present invention.

FIG. 14 is a block diagram of a communication apparatus according to an embodiment of the present invention;

MODE FOR INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is an example of default data path for communication between two UEs. With reference to FIG. 5, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 6 and 7 are examples of data path scenarios for a proximity communication. If wireless devices (e.g., UE1, UE2) are in proximity of each other, they may be able to use a direct mode data path (FIG. 6) or a locally routed data path (FIG. 7). In the direct mode data path, wireless devices are connected directly each other (after appropriate procedure(s), such as authentication), without eNB and SGW/PGW. In the locally routed data path, wireless devices are connected each other through eNB only.

FIG. 8 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 8.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:

Interworking via a reference point towards the 3rd party Applications

Authorization and configuration of the UE for discovery and Direct communication Enable the functionality of the EPC level ProSe discovery ProSe related new subscriber data and/handling of data storage; also handling of ProSe identities;

Security related functionality

Provide Control towards the EPC for policy related functionality

Provide functionality for charging (via or outside of EPC, e.g. offline charging)

Especially, the following identities are used for ProSe Direct Communication:

Source Layer-2 ID identifies a sender of a D2D packet at PC5 interface. The Source Layer-2 ID is used for identification of the receiver RLC UM entity;

Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

FIG. 9 is a conceptual diagram illustrating for a Layer 2 structure for Sidelink. The Sidelink is UE to UE interface for ProSe direct communication and ProSe Direct Discovery.

Correspond to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

FIG. 10*a* is a conceptual diagram illustrating for User-Plane protocol stack for ProSe Direct Communication, and FIG. 10*b* is Control-Plane protocol stack for ProSe Direct Communication.

FIG. 10*a* shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 10*a*.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 10*b* shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

FIG. 11 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 11.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Recently, the extension of network coverage using L3-based UE-to-Network Relay is expected to be supported. When the UE starts ProSe communication within the network and then moves out of the coverage, the relay may be selected by the UE or the network for service coverage extension. During changing the traffic path of the (potential) remote UE from eNB to a relay, there could be service interruption if the relaying service activation (including relay selection) for the remote UE is performed too late. On the contrary, if the relaying service activation is performed early, the remote UE might have dual connectivity for the same (or different) PDN connection(s) where one connectivity goes through the eNB and another goes through relay. In addition, the (potential) UE may establish unnecessary connection between relay.

FIG. 12 is a conceptual diagram for uplink grant reception.

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

When the UE receives a valid uplink grant for transmitting uplink data and for a subframe N+K on a subframe N, the UE transmits the uplink data on a subframe N+K using the uplink grant. And then, the UE receives ACK/NACK feedback for transmission of the uplink data on a subframe N+K+I, and if the UE receives NACK indication, the UE should retransmits the UL data on a subframe N+K+I+J.

In detail, if the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI: if an uplink grant for this TTI and this Serving Cell has been received on the PDCCH for the MAC entity's C-RNTI or Temporary C-RNTI; or if an uplink grant for this TTI has been received in a Random Access Response, consider the NDI to have been toggled for the corresponding HARQ process regardless of the value of the NDI if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant, and deliver the uplink grant and the associated HARQ information to the HARQ entity for this TTI.

HARQ Operation

There is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

At a given TTI, if an uplink grant is indicated for the TTI, the HARQ entity identifies the HARQ processes for which a transmission should take place. It also routes the received HARQ feedback (ACK/NACK information), MCS and resource, relayed by the physical layer, to the appropriate HARQ processes.

For each TTI, the HARQ entity shall identify the HARQ process(es) associated with this TTI, and for each identified HARQ process, the MAC entity shall obtain the MAC PDU to transmit from the Msg3 buffer if there is a MAC PDU in the Msg3 buffer and the uplink grant was received in a Random Access Response, deliver the MAC PDU and the uplink grant and the HARQ information to the identified HARQ process, and instruct the identified HARQ process to trigger a new transmission, if the uplink grant was received on PDCCH.

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall set HARQ_FEEDBACK to the received value.

If the HARQ entity requests a new transmission, the HARQ process shall set CURRENT_TX_NB to 0, set CURRENT_IRV to 0, store the MAC PDU in the associated HARQ buffer, store the uplink grant received from the HARQ entity, set HARQ_FEEDBACK to NACK, and generate a transmission as described below.

If the HARQ entity requests a retransmission, the HARQ process shall increment CURRENT_TX_NB by 1. If the HARQ entity requests an adaptive retransmission, the HARQ process shall store the uplink grant received from the HARQ entity, set CURRENT_IRV to the index corresponding to the redundancy version value provided in the HARQ information, set HARQ_FEEDBACK to NACK, and generate a transmission as described below. Else if the HARQ entity requests a non-adaptive retransmission, if HARQ_FEEDBACK=NACK, the HARQ process shall generate a transmission as described below.

To generate a transmission, the HARQ process shall instruct the physical layer to generate a transmission according to the stored uplink grant with the redundancy version corresponding to the CURRENT_IRV value, and increment CURRENT_IRV by 1 if the MAC PDU was obtained from the Msg3 buffer; or if there is no measurement gap at the time of the transmission and, in case of retransmission, the retransmission does not collide with a transmission for a MAC PDU obtained from the Msg3 buffer in this TTI.

If there is a measurement gap at the time of the HARQ feedback reception for this transmission and if the MAC PDU was not obtained from the Msg3 buffer, the HARQ process shall set HARQ_FEEDBACK to ACK at the time of the HARQ feedback reception for this transmission.

After performing above actions, the HARQ process then shall flush the HARQ buffer if CURRENT_TX_NB=maximum number of transmissions−1.

Up to Rel-12, the UE can transmit the data by using the uplink grant received dynamically by the PDCCH or by using SPS resource. In case the UE receives the uplink grant which collides with the SPS resource, it is specified in TS36.321 Section 5.4.1 which resource among the uplink grant and SPS resource the UE selects.

In Rel-13, in order to reduce latency in uplink data transmission, contention based PUSCH, i.e., CB-PUSCH, transmission has been considered in 3GPP. Accordingly, when transmitting data to the eNB, the UE has three options, i.e., by using UL grant, SPS resource, or CB-PUSCH resource.

As SPS resource and CB-PUSCH resource can be pre-configured by the network in a way that there is no collision between them, the potential collision by introducing CB-PUSCH transmission would be the collision between CB-PUSCH resource and UL grant. Considering that the UE can benefit from CB-PUSCH transmission at the cost of potential contention which may result in data transmission failure, in case the UE has the uplink grant, there is no reason for the UE to transmit the data by using CB-PUSCH resource.

Since it takes time in getting uplink grant by BSR/SR/RA procedure, processing the received uplink grant, processing the MAC PDU to be transmitted on the uplink grant, there could be different understanding in ‘the UE has uplink grant’. Therefore, the UE needs to determine whether to transmit data on CB-PUSCH resource or UL grant by taking the above aspects into account.

Multiplexing and Assembly

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The MAC entity shall maintain a variable Bj for each logical channel j. Bj shall be initialized to zero when the related logical channel is established, and incremented by the product PBR*TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR*BSD, where PBR and BSD are configured by upper layers.

The MAC entity shall perform the following Logical Channel Prioritization procedure when a new transmission is performed. The MAC entity shall allocate resources to the logical channels in the following steps.

Step 1: All the logical channels with Bj>0 are allocated resources in a decreasing priority order. If the PBR of a logical channel is set to “infinity”, the MAC entity shall allocate resources for all the data that is available for transmission on the logical channel before meeting the PBR of the lower priority logical channels.

Step 2: the MAC entity shall decrement Bj by the total size of MAC SDUs served to logical channel j in Step 1.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The MAC entity shall not transmit data for a logical channel corresponding to a radio bearer that is suspended.

SL Grant reception and SCI transmission

Sidelink transport channel types are:

1. Sidelink broadcast channel (SL-BCH) characterized by pre-defined transport format.

2. Sidelink discovery channel (SL-DCH) characterized by, i) fixed size, pre-defined format periodic broadcast transmission, ii) support for both UE autonomous resource selection and scheduled resource allocation by eNB, iii) collision risk due to support of UE autonomous resource selection; no collision when UE is allocated dedicated resources by the eNB.

3. Sidelink shared channel (SL-SCH) characterized by, i) support for broadcast transmission, ii) support for both UE autonomous resource selection and scheduled resource allocation by eNB, iii) collision risk due to support of UE autonomous resource selection; no collision when UE is allocated dedicated resources by the eNB, iv) support for HARQ combining, but no support for HARQ feedback, v) support for dynamic link adaptation by varying the transmit power, modulation and coding.

SL-SCH Data Transmission

In order to transmit on the SL-SCH the UE must have a sidelink grant. The sidelink grant is selected as follows:

i) If the UE receives a sidelink grant dynamically on the PDCCH or EPDCCH, the UE shall use the received sidelink grant determine the set of subframes in which transmission of sidelink control information and transmission of first transport block occur, consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available, and clear the configured sidelink grant at the end of the corresponding SC Period.

ii) If the UE is configured by upper layers to transmit using a pool of resources as indicated and data is available in STCH and if the UE does not have a configured sidelink grant, the UE shall randomly select a sidelink grant from the resource pool configured by upper layers. The random function shall be such that each of the allowed selections can be chosen with equal probability, use the selected sidelink grant determine the set of subframes in which transmission of sidelink control information and transmission of first transport block occur, consider the received sidelink grant to be a configured sidelink grant occurring in those subframes starting at the beginning of the first available SC Period which starts at least 4 subframes after the subframe in which the sidelink grant was received, and clear the configured sidelink grant at the end of the corresponding SC Period.

If the UE has a configured sidelink grant occurring in this subframe, for each subframe, the UE shall instruct the physical layer to transmit a scheduling assignment corresponding to the configured sidelink grant if the configured sidelink grant corresponds to transmission of sidelink control information. Else if the configured sidelink grant corresponds to transmission of first transport block, the UE shall deliver the configured sidelink grant and the associated HARQ information to the Sidelink HARQ Entity for this subframe.

SL-SCH Data Reception

Scheduling assignments transmitted on the PSCCH indicate if there is a transmission on SL-SCH and provide the relevant HARQ information.

For each subframe during which the UE monitors PSCCH, the UE shall store the scheduling assignment and associated HARQ information as scheduling assignment valid for the subframes corresponding to first transmission of each transport block if a scheduling assignment for this subframe has been received on the PSCCH for a Sidelink Scheduling Assignment Identity of interest to this UE.

For each subframe for which the UE has a valid scheduling assignment, the UE shall deliver the scheduling assignment and the associated HARQ information to the Sidelink HARQ Entity.

In D2D, for a UE in mode 2 operation, the data transmission can be summarized as follows: i) if there is data in STCH and the UE does not have a configured sidelink grant for the next SC period, the UE selects an SL grant, ii) Using the selected SL grant, the UE determines the subframes to transmit SCT and the first TB, iii) The UE considers the selected SL grant as configured SL grant.

Since the SCI includes the information of data transmission, in principle, the SCI does not need to be transmitted in case there is no data to transmit. Once the transmitting UE in mode 2 selects the SL grant, the UE will transmit SCI to the receiving UE. From the receiving UE point of view, if the receiving UE receives a SCI, the UE will unnecessarily perform the HARQ process even though there is no received TB. Therefore, it is desirable for a UE to select the SL grant only in case there is data available for transmission in the SC period with which the SL grant is associated.

In the prior art, when the UE receives an UL/SL grant, the UE performs Logical Channel Prioritization (LCP) procedure to construct a MAC PDU by multiplexing data from multiple logical channels. If there are multiple RBs having data, then the data from all RBs are included in the MAC PDU depending on the priority and PBR configuration. The UE transmits the constructed MAC PDU using the received UL/SL grant. In some cases, the eNB may want to provide an UL/SL grant for the UE to transmit data of a specific RB. However, with the prior art, it is not possible unless data from all other RBs are not available since the priority and PBR configuration is semi-statically configured via a higher layer (e.g., RRC).

FIG. 13 is a flowchart illustrating a method for transmitting data in accordance with one embodiment of the present invention.

Referring to FIG. 13, the UE may receive a grant with an indication that indicates a radio bearer (RB) of which data should be transmitted using the received grant from the eNB (S1310). In addition, the indication may indicate multiple RBs (but, not all RBs). At this, the each of multiple RBs may be associated with a respective logical channel priority. The indication may be included in the grant or transmitted together with the grant as separate control information.

Subsequently, the UE may generate a medium access control protocol data unit (MAC PDU) including data of the indicated RB, regardless of a logical channel priority of the indicated RB or configured logical channel priorities (S1320). As an example, the UE may perform logical channel prioritization (LCP) procedure only for the indicated RB. After that, if there is remaining space in the grant after performing LCP procedure for the indicated RB, the UE may fill the remaining space either with Padding or with data from other RBs by performing another LCP procedure for other RBs. If the remaining space is filled with Padding, the constructed MAC PDU contains only data from the indicated RB.

As another example, the UE may change logical channel priorities of the RBs indicated by the indication to be higher than logical channel priorities of the RBs not indicated by the indication and prioritized bit rate (PBR) of the indicated RBs to infinity when the MAC PDU is generated. For example, the UE may change the logical channel priority of the indicated RB to the highest priority and changes PBR of the indicated RB to infinity, and then performs LCP procedure for all RBs. For example, for each logical channel in the UE, a prioritized data rate is configured in addition to the priority value. Logical channels are then served in decreasing priority order up to their prioritized data rate (Prioritized Bit Rate, PRB), which avoids starvation as long as the scheduled data rate is at least as large as the sum of the prioritized data rates. Beyond the prioritized bit rates, logical channels are served in strict priority order until the grant is fully exploited or the buffer is empty. According to this example, the UE may preferentially transmit the data of the logical channel of the indicated RB through the LPC procedure.

As another example, the multiple RBs may be indicated with grant. In this case, the UE may construct a MAC PDU with data from the indicated RBs. For example, the UE may perform LCP procedure only for the indicated RBs. The priority of the indicated RBs follows original logical channel priority of the RB. If there is remaining space in the grant after performing LCP procedure for the indicated RBs, the UE fills the remaining space either with Padding or with data from other RBs by performing another LCP procedure for other RBs. If the remaining space is filled with Padding, the constructed MAC PDU contains only data from the indicated RBs.

For another example, the UE may change the logical channel priorities of the indicated RBs to the highest priority and changes PBRs of the indicated RBs to infinity. Then, the UE performs LCP procedure for all RBs. As described in the above example, the UE may preferentially transmit the data of the logical channels of each of the indicated RBs through the LPC procedure.

After generating the MAC PDU, the UE may transmit the MAC PDU using the grant (S1330). For example, the grant may correspond to UL grant used for the UE to transmit data to the eNB via Uu interface. For another example, the grant may correspond to SL grant used for the UE to transmit data to an associated UE via PC5 interface. At this, the grant may correspond to a resource indicated by the grant.

As another embodiment, the eNB may provide an indication that indicates which logical channel group (LCG) should be prioritized to use the grant. The indication may be included in the grant or transmitted together with grant as separate control information.

When the UE receives the grant with LCG indication, the UE may construct a MAC PDU with data from the RBs of the indicated LCG. As an example, The UE may perform LCP procedure only for the RBs of the indicated LCG. The priority of the RBs of the indicated LCG follows logical channel priority of the RB. If there is remaining space in the grant after performing LCP procedure for the RBs of the indicated LCG, the UE may fill the remaining space either with Padding or with data from RBs of other LCGs by performing another LCP procedure for RBs of other LCGs. If the remaining space is filled with Padding, the constructed MAC PDU contains only data from the RBs of indicated LCG.

As another example, the UE may change the logical channel priority of the RBs of the indicated LCG to the highest priority and changes PBR of the RBs of the indicated LCG to infinity, and then performs LCP procedure for all RBs.

As another example, a multiple LCGs may be indicated with grant. In this case, the UE may construct a MAC PDU with data from the indicated LCGs. For example, the UE may perform LCP procedure only for the RBs of the indicated LCGs. The priority of the RBs of the indicated LCGs follows logical channel priority of the RB. If there is remaining space in the grant after performing LCP procedure for the RBs of the indicated LCGs, the UE may fill the remaining space either with Padding or with data from RBs of other LCGs by performing another LCP procedure for RBs of other LCGs. If the remaining space is filled with Padding, the constructed MAC PDU contains only data from the RBs of indicated LCGs.

For another example, the UE may change the logical channel priority of the RBs of the indicated LCGs to the highest one and changes PBR of the RBs of the indicated LCGs to infinity, and then performs LCP procedure for all RBs.

After generating the MAC PDU, the UE may transmit the MAC PDU using the grant. For example, the grant may correspond to UL grant used for the UE to transmit data to the eNB via Uu interface. For another example, the grant may correspond to SL grant used for the UE to transmit data to an associated UE via PC5 interface. At this, the grant may correspond to a resource indicated by the grant.

FIG. 14 is a block diagram of a communication apparatus according to an embodiment of the present invention.

The apparatus shown in FIG. 14 can be a user equipment (UE) and/or eNB adapted to perform the above mechanism, but it can be any apparatus for performing the same operation.

As shown in FIG. 14, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 14 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 14 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 13.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   - receiving, from a base station, a grant including an indication that indicates to the UE at least one radio bearer (RB) to be prioritized among a plurality of configured RBs,
   - wherein each of the configured RBs is related to at least one logical channel having a respective logical channel priority;
   - changing at least one logical channel priority related to the at least one RB to be higher than at least one logical channel priority of other at least one RB which is not indicated by the indication based on the indication included in the received grant;
   - changing a prioritized bit rate (PBR) related to the at least one RB to infinity based on the indication included in the received grant;
   - generating a medium access control protocol data unit (MAC PDU) by performing a logical channel prioritization (LCP) procedure; and
   - transmitting the generated MAC PDU based on the grant.

2. The method according to claim 1, wherein based on the at least one RB including two or more RBs, the logical channel prioritization (LCP) procedure for generating the MAC PDU is performed in a decreasing order of logical channel priorities of the two or more RBs.

3. The method according to claim 1, wherein based on a remaining space in the grant after performing the logical channel prioritization (LCP) procedure for the at least one RB, the UE fills the remaining space either with padding.

4. The method according to claim 1, wherein the indication indicates the at least one RB corresponds to a logical cell group (LCG) Logical Cell Group.

5. The method according to claim 1, wherein the grant is an uplink grant used for the UE to transmit the data to the base station via a Uu interface or a sidelink grant used for the UE to transmit the data to an associated UE via PC5 interface.

6. A User Equipment (UE) for operating in a wireless communication system, the UE comprising:
   - a Radio Frequency (RF) module including a transceiver; and
   - a processor operably coupled with the RF module,
   - wherein the processor is configured to:
     - control the RF module to receive, from a base station, a grant including an indication that indicates to the UE at least one radio bearer (RB) to be prioritized among a plurality of configured RBs,
     - wherein each of the configured RBs is related to at least one logical channel having a respective logical channel priority,
     - change at least one logical channel priority related to the at least one RB to be higher than at least one logical channel priority of other at least one RB which is not indicated by the indication based on the indication included in the received grant,
     - changing a prioritized bit rate (PBR) related to the at least one RB to infinity based on the indication included in the received grant,
     - generate a medium access control protocol data unit (MAC PDU) by performing a logical channel prioritization (LCP) procedure, and
     - control the RF module to transmit the generated MAC PDU based on the grant.

7. The UE according to claim 6, wherein based on the at least one RB including two or more RBs, the logical channel prioritization (LCP) procedure for generating the MAC PDU is performed in a decreasing order of logical channel priorities of the two or more RBs.

8. The UE according to claim 7, wherein based on a remaining space in the grant after performing the logical channel prioritization (LCP) procedure for the at least one RB, the UE fills the remaining space either with padding.

9. The UE according to claim 7, wherein the indication indicates the at least one RB corresponds to a logical cell group (LCG) Logical Cell Group.

10. The UE according to claim 7, wherein the grant is an uplink grant used for the UE to transmit the data to the base station via a Uu interface or a sidelink grant used for the UE to transmit the data to an associated UE via PC5 interface.

* * * * *